(12) United States Patent
Liaudanskas et al.

(10) Patent No.: US 12,307,599 B2
(45) Date of Patent: May 20, 2025

(54) WEAK MULTI-VIEW SUPERVISION FOR SURFACE MAPPING ESTIMATION

(71) Applicant: Fyusion, Inc., San Francisco, CA (US)

(72) Inventors: Aidas Liaudanskas, San Francisco, CA (US); Nishant Rai, San Francisco, CA (US); Srinivas Rao, San Francisco, CA (US); Rodrigo Ortiz-Cayon, San Francisco, CA (US); Matteo Munaro, San Francisco, CA (US); Stefan Johannes Josef Holzer, San Mateo, CA (US)

(73) Assignee: Fyusion, Inc., San Francisco, CA (US)

( * ) Notice: Subject to any disclaimer, the term of this patent is extended or adjusted under 35 U.S.C. 154(b) by 250 days.

(21) Appl. No.: 17/659,449

(22) Filed: Apr. 15, 2022

(65) Prior Publication Data

US 2022/0343601 A1    Oct. 27, 2022

Related U.S. Application Data

(60) Provisional application No. 63/177,580, filed on Apr. 21, 2021.

(51) Int. Cl.
*G06T 17/20* (2006.01)
*G06T 7/70* (2017.01)
*G06V 20/64* (2022.01)

(52) U.S. Cl.
CPC .......... *G06T 17/20* (2013.01); *G06T 7/70* (2017.01); *G06V 20/647* (2022.01); *G06T 2207/20081* (2013.01); *G06T 2207/20084* (2013.01); *G06T 2207/30248* (2013.01)

(58) Field of Classification Search
None
See application file for complete search history.

(56) References Cited

U.S. PATENT DOCUMENTS

| 2006/0017723 | A1 | 1/2006  | Baran    |
| 2013/0307848 | A1 | 11/2013 | Tena     |
| 2013/0314412 | A1 | 11/2013 | Gravois  |
| 2016/0027200 | A1 | 1/2016  | Corazza  |
| 2017/0148179 | A1 | 5/2017  | Holzer   |

(Continued)

OTHER PUBLICATIONS

Tulsiani et al. "Implicit mesh reconstruction from unannotated image collections." arXiv preprint arXiv:2007.08504 (2020). (Year: 2020).*

(Continued)

*Primary Examiner* — Yi Wang
(74) *Attorney, Agent, or Firm* — Kwan & Olynick LLP

(57) ABSTRACT

One or more two-dimensional images of a three-dimensional object may be analyzed to estimate a three-dimensional mesh representing the object and a mapping of the two-dimensional images to the three-dimensional mesh. Initially, a correspondence may be determined between the images and a UV representation of a three-dimensional template mesh by training a neural network. Then, the three-dimensional template mesh may be deformed to determine the representation of the object. The process may involve a reprojection loss cycle in which points from the images are mapped onto the UV representation, then onto the three-dimensional template mesh, and then back onto the two-dimensional images.

20 Claims, 8 Drawing Sheets

(56) References Cited

U.S. PATENT DOCUMENTS

2017/0374341 A1    12/2017    Michail
2019/0026917 A1*    1/2019    Liao ........................ G06V 10/82
2021/0287430 A1*    9/2021    Li ........................ G06V 10/776

OTHER PUBLICATIONS

International Preliminary Report on Patentability issued in App. No. PCT/US2022/071754, mailing date Nov. 2, 2023, 8 pages.
Kanazawa, et al., "Learning Category-Specific Mesh Reconstruction from Image Collections," University of California, Berkley, arXiv:1803.07549v2 [cs.CV] Jul. 30, 2018, 21 pages.
Kulkarni, et al., "Articulation-aware Canonical Surface Mapping," arXiv:2004.00614v3 [cs.CV] May 26, 2020, 17 pages.
Kulkarni, et al., "Canonical Surface Mapping via Geometric Cycle Consistency," Carnegie Mellon University, arXiv:1907.10043v2 [cs.CV] Aug. 15, 2019, 16 pages.
International Search Report and Written Opinion issued in App. No. PCT/US2022/071754, mailing date Jul. 13, 2022, 10 pages.
Rai et al., "Weak Multi-View Supervision for Surface Mapping Estimation", Proceedings of the IEEE/CVF Conference on Computer Vision and Pattern Recognition, 2021, May 4, 2021, https://arxiv.org/pdf/2105.01388.pdf, 10 pages.

* cited by examiner

WEAK MULTI-VIEW SUPERVISION FOR SURFACE MAPPING ESTIMATION

CROSS-REFERENCE TO RELATED APPLICATIONS

This application claims priority to provisional U.S. Patent Application 63/177,580 titled "WEAK MULTI-VIEW SUPERVISION FOR SURFACE MAPPING ESTIMATION", filed by Liaudanskas et al. on Apr. 21, 2021, which is hereby incorporated by reference in its entirety and for all purposes.

COPYRIGHT NOTICE

A portion of the disclosure of this patent document contains material which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

TECHNICAL FIELD

The present disclosure relates generally to the capture and presentation of image data of an object, and more specifically to detecting damage to objects.

DESCRIPTION OF RELATED ART

Understanding the structure of objects and scenes from images has been an intensively researched topic in 3D computer vision. In conventional approaches, researchers applied Structure from Motion (SfM) and multi-view stereo techniques to sets of images to obtain point clouds, which could be converted to meshes using triangulation techniques. Later, representing object shapes as principal component analysis components or as 3D-morphable models gained popularity. Unlike SfM techniques, the benefit was the ability to generate a mesh even from a single image, as mesh generation was reduced to a model fitting problem.

Subsequently, with the rise of convolutional neural networks (CNNs) and their performance in image-to-image tasks, many explored the possibility of generating 3D point clouds and meshes with CNNs. However, most of these approaches relied on extensive supervision and well-curated datasets, thus requiring a lot of effort to extend them to work on new object categories. Instead of having fully annotated data, unsupervised or self-supervised techniques aim to reduce the amount of data and priors that is needed for training. Among those, some works targeted category-specific reconstruction. Unfortunately, these approaches still rely on moderate supervision, in particular in the form of labelled keypoints, which are often hard to compute or require expert annotation. Some conventional approaches dismissed this requirement, but only for computing dense pixel correspondences or surface mappings without actually predicting a mesh. Such approaches often rely on an underlying static mesh which leads to an approximate surface mapping learning. Nevertheless, improved techniques for determining the structure of objects and scenes from images are desired.

BRIEF DESCRIPTION OF DRAWINGS

The included drawings are for illustrative purposes and serve only to provide examples of possible structures and operations for the disclosed inventive systems, apparatus, methods and computer program products for image processing. These drawings in no way limit any changes in form and detail that may be made by one skilled in the art without departing from the spirit and scope of the disclosed implementations.

DETAILED DESCRIPTION

Figure 1:
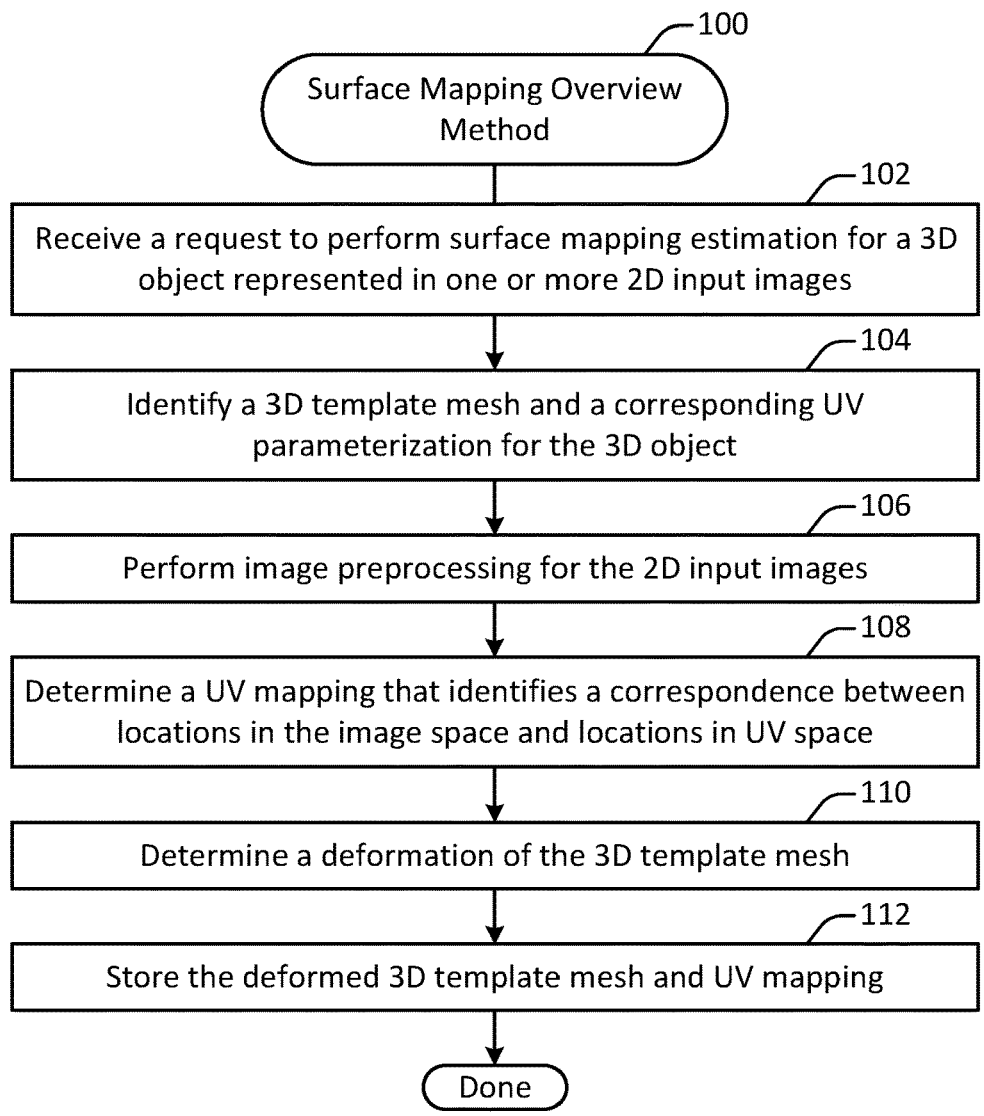
FIG. 1 illustrates an overview method for surface mapping estimation, performed in accordance with one or more embodiments.

According to various embodiments, techniques and mechanisms described herein provide for a weakly-supervised multi-view learning approach to learn category-specific surface mapping without dense annotations. The system learns the underlying surface geometry of common categories, such as human faces, cars, and airplanes, given instances from those categories. While traditional approaches solve this problem use extensive supervision in the form of pixel-level annotations, techniques and mechanisms described herein take advantage of the fact that pixel-level UV and mesh predictions can be combined with 3D reprojections to form consistency cycles. As a result of exploiting these cycles, techniques and mechanisms described herein can establish a dense correspondence mapping between image pixels and the mesh acting as a self-supervisory signal, which in turn helps improve our overall estimates. In some embodiments, this approach leverages information from multiple views of the object to establish additional consistency cycles, thus improving surface mapping understanding without the need for explicit annotations. Some embodiments also involve the use of deformation fields for predictions of an instance specific mesh. Such techniques can generate accurate variations away from the mean shape, can be multi-view consistent, and can performs comparably or better than fully supervised approaches.

In contrast to conventional approaches, some embodiments described herein employ unrestrained messages and/or multi-view cues. The system may predict dense surface mappings along with a 3D mesh. The network may be trained to be multi-view consistent by taking advantage of multi-view cycles and using a reprojection loss which can result in improved performance. For instance, the system may use instance-specific deformation to learn using self-consistency in a multi-view setting.

In some implementations, techniques and mechanisms described herein may be computationally more efficient than other approaches that require differentiable renderings or iterative processing approaches because techniques and mechanisms described herein may rely on cycles (e.g., reprojection updates of the current prediction). Further, techniques and mechanisms described herein do not necessarily require multiple views, and can also work with single-view images. In some embodiments, the approach may be weakly-supervised as it only involves weak labels such as rough segmentation masks, camera poses and an average per-category mesh for training.

According to various embodiments, training may involve exploiting multi-view correspondences, for instance using a dataset that includes multiple images or a video of object instances of a given category. In some implementations, techniques and mechanisms described herein provide for a novel weakly-supervised approach which learns the surface mapping and 3D structure of a category from a collection of multi-view images. Alternatively, or additionally, a training regime may exploit cycle consistency across different views learning instance-specific meshes by modelling deformations. Provided with an image at test time, the system can produce a unique mesh along with a dense correspondence surface map.

In some embodiments, the system may extract the underlying surface mapping of an object from a 2D image without having explicit annotations during training. The system may predict an instance-specific shape with a common topology during inference while training the model in a weakly-supervised manner without using dense pixel-wise annotations. The system may utilize segmentation masks, camera poses and RGB images to learn to predict the 3D structure. The system may exploit information present in multi-view images of each instance to improve our learning. For each category, the system may utilize a single input mesh or a set of input meshes. In some implementations, the system may only require a single image (e.g., a 2D RGB image) for inference, although additional images may improve surface mapping performance.

FIG. 1 illustrates an overview method 100 for surface mapping estimation, performed in accordance with one or more embodiments. According to various embodiments, the method 100 may be used to estimate a three-dimensional surface map for an object represented in one or more input images. The method 100 may be performed at any suitable computing device, such as the device 200 shown in FIG. 2.

A request is received at 102 to perform surface mapping estimation for a 3D object represented in one or more 2D input images. According to various embodiments, a surface mapping estimation may include determining a three-dimensional model for the 3D object along with a correspondence between pixels in the 2D input images and the 3D object.

A 3D template mesh and a corresponding UV parameterization for the 3D object are identified 104. According to various embodiments, the 3D template mesh may include a set of coordinates in a three-dimensional (e.g., X, Y, Z) coordinates space as well as a set of edges between those coordinates that collectively form a three-dimensional shape corresponding to a particular type of object. The UV parameterization includes a bijection mapping of 3D locations in the 3D coordinate space to 2D locations in a 2D UV space. That is, the 2D UV space may function as a manifold providing a 2D representation of the 3D space.

According to various embodiments, the 3D template mesh may be associated with a particular object type. For example, one 3D template mesh and corresponding UV parameterization may be used for surface mapping estimation of people, while a different 3D template mesh and corresponding UV parameterization may be used for surface mapping estimation of vehicles. In particular embodiments, different object subtypes may be associated with different template meshes. For instance, within the vehicle space, trucks may be associated with one template mesh, while sedans may be associated with a different template mesh.

In some embodiments, determining a 3D template mesh may involve performing object recognition on one or more of the input images. For instance, one or more input images may be analyzed to determine that an object represented in the images is a vehicle, a particular type of vehicle (e.g., a sedan, a truck, etc.), a person, or some other type of object. Then, once the object type is identified, the 3D template mesh corresponding with that object type is identified.

Image preprocessing is performed for the 2D input images at 106. According to various embodiments, the image preprocessing may involve any of a range of suitable preprocessing techniques. For example, pose detection may be performed. Pose detection may involve determining a pose for an image relative to the 3D template mesh determined at 104. The pose may include positional information such as the estimated location in three-dimensions of the camera that captured an input image. Additionally, the pose may include rotational information such as roll, pitch, and yaw for the camera that captured the image. As another example, object mask determination may be performed. Object mast determination may involve separating an area of an image that includes an object for modeling from another area of the image that includes background scenery that is not modeled.

A UV mapping for one or more input images is determined using the 3D template mesh at 408. According to various embodiments, UV mapping refers to a process in which a 2D image is projected onto a 3D model's surface. The letters "U" and "V" denote the axes of the 2D texture. As one example, a geographic map of the globe may be thought of as a two-dimensional (i.e., U,V) representation of a three-dimensional (i.e., X,Y,Z) object. The UV mapping may be determined by employing a training cycle in which pixels of an image are first mapped to the UV space and then to a 3D mesh. A 3D point is then projected back into RGB image space. The displacement of the reprojected pixel location against the starting pixel location, which is referred to herein as reprojection consistency loss, is taken as the error signal for learning improved UV predictions. For example, the reprojection consistency loss may be measured as the displacement in two-dimensional space between the two coordinate values. This cycle can be repeated to improve the UV mapping. Additional details related to the determination of a UV mapping are discussed throughout the application, and particularly with respect to the method 400 shown in FIG. 4.

A deformation of the template mesh is determined based on the UV mapping at 110. According to various embodiments, the deformation may be determined by generalizing the cycle described with respect to operation 108 to allow for deformation of the 3D mesh. After iteratively training the model, the resulting deformation represents an estimated surface mapping of the object represented in the 2D image or images. The resulting deformation may then be stored at 108 on a storage device. Additional details regarding the determination of a deformation of the 3D template mesh are discussed throughout the application, and particularly with respect to the method 600 shown in FIG. 6.

Figure 2:
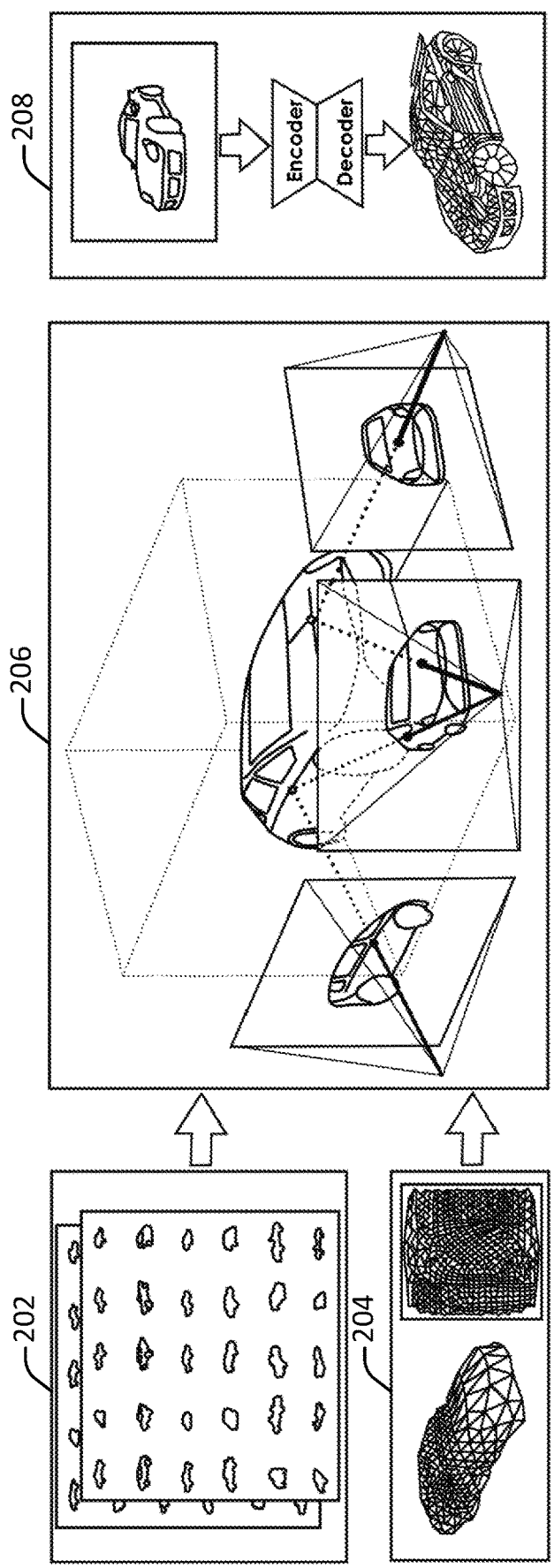
FIG. 2 illustrates a graphical overview of a method for surface view mapping estimation, performed in accordance with one or more embodiments.

FIG. 2 illustrates a graphical overview of a method 200 for surface view mapping estimation, performed in accordance with one or more embodiments. An input dataset 202 includes one or more one or more images of an object. In addition, the input dataset includes one or more segmentation maps that may be used to separate the portion of an image in which the object is represented from background scenery that is not modeled. In some configurations, the input dataset may include one or more multi-view images of the object in which the object is captured from different perspectives.

A template mesh with a corresponding set of UV coordinates is shown at 204. The template mesh is a generic three-dimensional representation of the object type. For example, upon a determination that the object type is a vehicle, a template mesh providing a generic three-dimensional representation of a vehicle may be identified. The template mesh may be predetermined for the object type as a whole, without consideration of the input images provided at 202. Alternatively, a simple 3D template mesh may be determined by applying a neural network or other image processing technique to the input images at 202. The UV coordinates included with the template mesh may map the input mesh to the UV space.

At 206, the system may train a network exploiting information from multiple views using reprojection cycles to learn an instance-specific mesh using deformations. In a testing phase at 208, the model predicts an instance-specific mesh and a surface mapping from as little as a single image.

According to various embodiments, UVs may be used as a parametrization of the mesh onto a 2D plane to represent texture maps of a mesh. The system may represent the mesh as a function of UV space, i.e., as a position map. Given a pixel in the image, instead of directly predicting its 3D position on a mesh, the system may map each pixel to a corresponding UV coordinate and in turn map each UV coordinate onto the position map (which is equivalent to a mesh). The position maps may represent a frontalized mesh located in a cube at the origin, as opposed to conventional techniques that employ a mesh projected onto the image. The system may refer to this position map as D(I) which maps UV points to their 3D locations (e.g., $D(I) \in R^2 \rightarrow R^3$). In this model, D represents a neural network which takes an image I as input and predicts a position map. Similarly, the function mapping image locations to their UVs is represented by $f_{uv}(I) \in R^2 \rightarrow R^2$, which represents a neural network which takes an image I as input and predicts the UV location of each pixel. For brevity, D(I) may be written herein as D and $f_{uv}(I)$ may be written as f(I).

Figure 3:
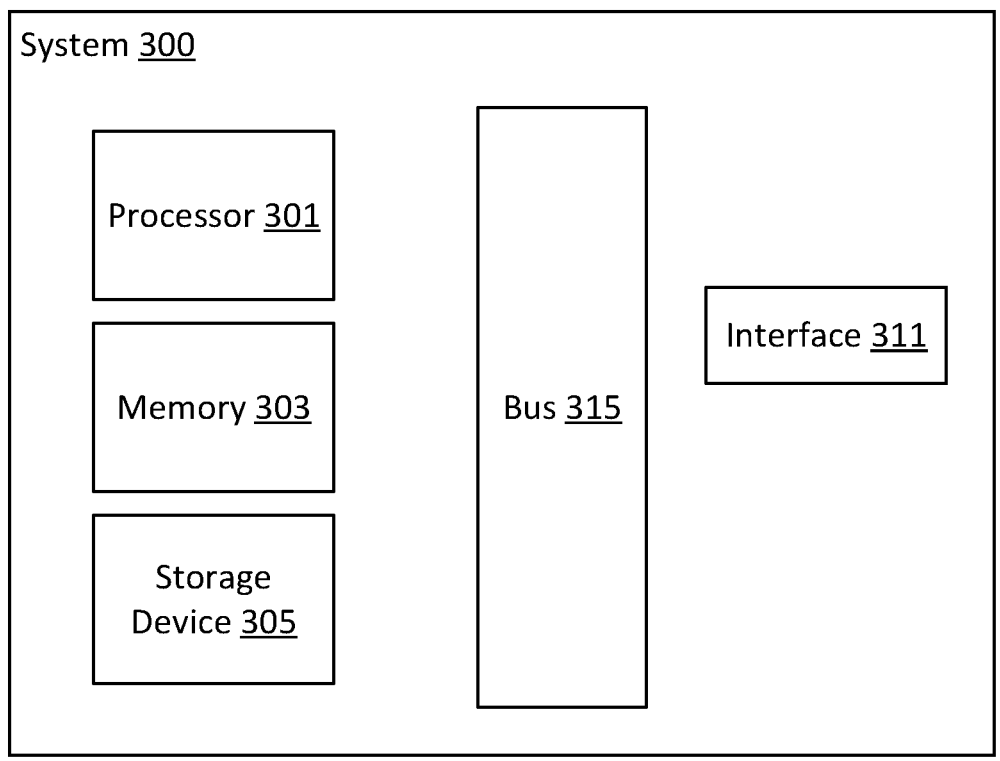
FIG. 3 illustrates a computer system configured in accordance with one or more embodiments.

FIG. 3 illustrates one example of a computing device configured in accordance with one or more embodiments. The computing device 300 may be used in conjunction with the method 100 shown in FIG. 1 and/or any other method or technique described herein. According to various embodiments, a system 300 suitable for implementing embodiments described herein includes a processor 301, a memory module 303, a storage device 305, an interface 311, and a bus 315 (e.g., a PCI bus or other interconnection fabric.) System 300 may operate as variety of devices such as artificial image generator, or any other device or service described herein. Although a particular configuration is described, a variety of alternative configurations are possible. The processor 301 may perform operations such as those described herein. Instructions for performing such operations may be embodied in the memory 303, on one or more non-transitory computer readable media, or on some other storage device. Various specially configured devices can also be used in place of or in addition to the processor 301. The interface 311 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Figure 4:
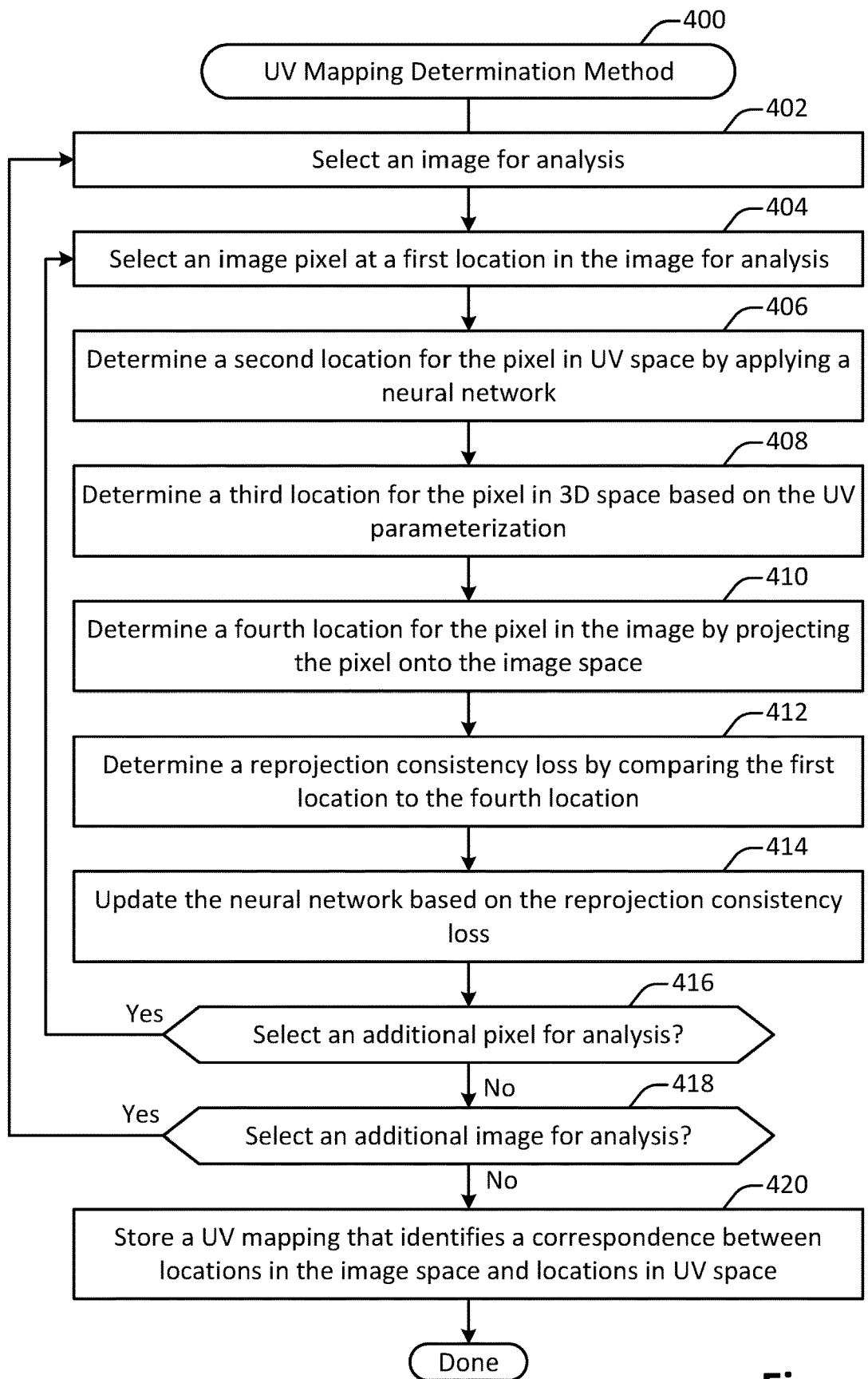
FIG. 4 illustrates a method for determining a UV mapping, performed in accordance with one or more embodiments.

FIG. 4 illustrates a method 400 for determining a UV mapping, performed in accordance with one or more embodiments. The method 400 may be used to train a neural network for mapping the input images to the UV space that then corresponds with the 3D template mesh. The method 400 may be performed based on a request received at operation 108 shown in FIG. 1. The method 400 may be performed at any suitable computing device.

Figure 5:
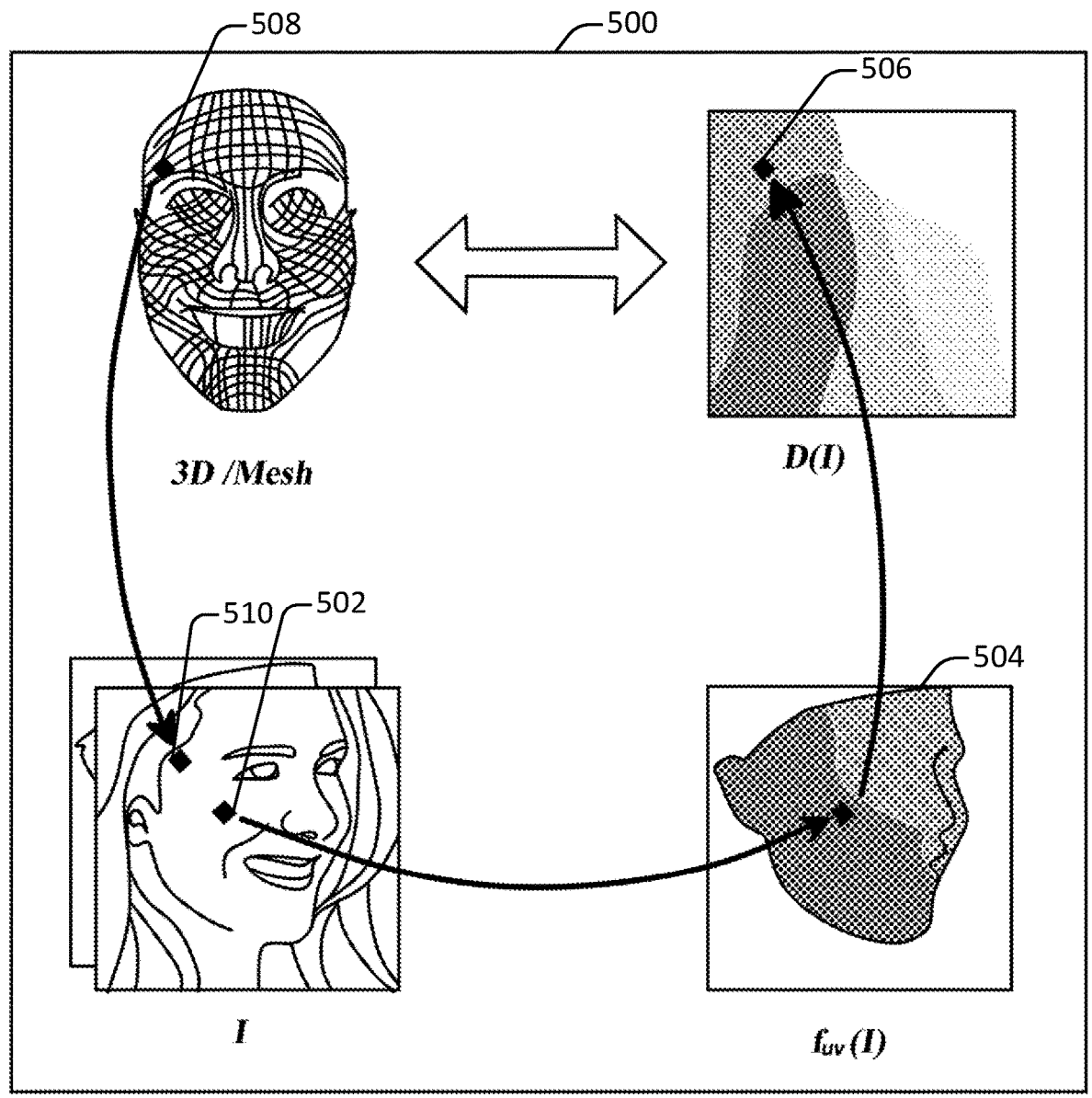
FIG. 5, which illustrates a single reprojection cycle, performed in accordance with one or more embodiments

FIG. 4 is described partially with respect to FIG. 5, which illustrates a single reprojection cycle 500, performed in accordance with one or more embodiments. According to various embodiments, the reprojection cycle 500 illustrates some of the operations discussed with respect to the method 400 shown in FIG. 4.

Returning to FIG. 4, an image is selected for analysis at 402. According to various embodiments, the image may be selected from the input images. Images may be analyzed in any suitable order, in sequence or in parallel.

An image pixel at a first location in the image is selected for analysis at 404. According to various embodiments, image pixels may be analyzed in any suitable order, in sequence or in parallel. Image pixels may be selected at random, in a predefined sequence, or via any other suitable selection criteria. An example of a pixel in a first location in an image is shown at 502 in FIG. 5.

A second location for the pixel in UV space is determined at 406 by applying a neural network. The neural network may receive as an input the first pixel location and produce as an output the second pixel location. The neural network may be, for example, a convolutional neural network initialized with a set of initialization weights that are then updated based on the operations shown in FIG. 4. An example of the neural network is shown at 504 in FIG. 5, while an example of the second location is shown at 506.

A third location for the pixel in 3D space is determined at 408 based on the UV parameterization. According to various embodiments, as discussed herein, the UV parameterization may define a bijection between locations in the UV space and locations in the 3D mesh. An example of the third location is shown at 508 in FIG. 5.

A fourth location for the pixel in the image is determined at 410 by projecting the pixel onto the image space. In some implementations, the pixel may be projected onto the image space based on pose information for the image determined in image processing. For instance, the image is estimated to be taken from a particular pose with respect to the 3D mesh. The pose defines a location and orientation of the camera. The pixel may then be projected onto a 2D plane from the perspective of the pose. The location of that projection may be treated as the fourth location. An example of the fourth location is shown at 510 in FIG. 5.

A reprojection consistency loss is determined at 412 by comparing the first location to the fourth location. The reprojection consistency loss may be measured as the two-dimensional difference in the image space between the two locations. For instance, the reprojection consistency loss may be conceptualized in FIG. 5 as a vector connecting the location 502 with the location 510.

The neural network is updated at 414 based on the reprojection consistency loss. According to various embodiments, any suitable neural network may be used. For example, the 3D mesh may be frontalized and located in a cube at origin. Accordingly, the system may represent the transformation from this frontalized coordinate system to the mesh in image by a transformation matrix $\phi_\pi$ where $\pi$ represents the camera parameters corresponding to the matrix. The cycle may star from pixel p in the image, going through the UV space and the 3D mesh. The reprojection cycle may thus be represented by the equation $p=\phi_\pi * D(f_{uv}(p))$.

In some implementations, given this reprojection cycle, the system may train a convolutional neural network (CNN) $f_{uv}(\cdot)$, which may predict a UV coordinate for each input image pixel. The approach derives the learning signal from the underlying geometry via the reprojection cycle. Starting from a pixel $p \in I$, the system can return back to the image space by transitioning through UV and 3D spaces and back to image using the transformation matrix $\phi_\pi$ to result in a pixel p'. Finally, the difference between p' and p provides the supervisory signal for learning the involved components, which may be computed as $L_{repr}=\Sigma_{p \in I}(p-p')^2$; $p'=\phi_\pi * D(f_{uv}(p))$.

In particular embodiments, the reprojection consistency loss $L_{repr}$ may be further transformed. For instance, a maximum value may be imposed to avoid over-weighting particular areas of an image that may match poorly to the 3D mesh.

In particular embodiments, smoothness may be enforced directly. For instance, reprojection consistency loss for a focal pixel may be constrained based on the values computed for neighboring pixels. Such an approach makes sense because nearby pixels in an image should map to nearby locations on the 3D mesh, barring occlusion (which is discussed in more detail below).

A determination is made at 416 as to whether to select an additional pixel for analysis. According to various embodiments, the determination may be made based on any of a variety of suitable criteria. In some implementations, each pixel in the image may be analyzed. Alternatively, a subset of pixels may be analyzed, for instance to improve computational efficiency.

If no additional pixels are to be selected, then at 418 a determination is made as to whether to select an additional image for analysis. According to various embodiments, the determination may be made based on any of a variety of suitable criteria. In some implementations, each input image may be analyzed. Alternatively, a subset of images may be analyzed, for instance to improve computational efficiency.

At 420, a UV mapping that identifies a correspondence between locations in the image space and locations in UV space is stored. The correspondence may be used to identify, for any location in the image space, a corresponding location in the UV space.

According to various embodiments, the cycle defined above does not directly handle occlusion, potentially resulting in occluded points being mapped onto the pixel in front of it. Such situations may be handled by the use of an additional visibility loss. A point is considered to be self-occluded under a camera pose if the z-coordinate of the pixel when projected into the image space associated with the camera pose is greater than the rendered depth at the point. To compute the rendered depth map for the given mesh instance under camera, the system may use the average mesh $D_{avg}$. The visibility loss $L_{vis}$ may be defined as:

$$L_{vis} = \sum_{p \in I} \max(0, p'[2] - p'_{avg}[2])$$

$$p'_{avg} = \phi_{pi} * D_{avg}(f_{uv}(p))$$

Here, p'[2] represents the z coordinate of the pixel when the corresponding point in 3D is projected into image space. The system may employ utilize segmentation masks to mask the points for which $L_{repr}$ and $L_{vis}$ are computed, which may lead to greater stability and performance during training.

Figure 6:
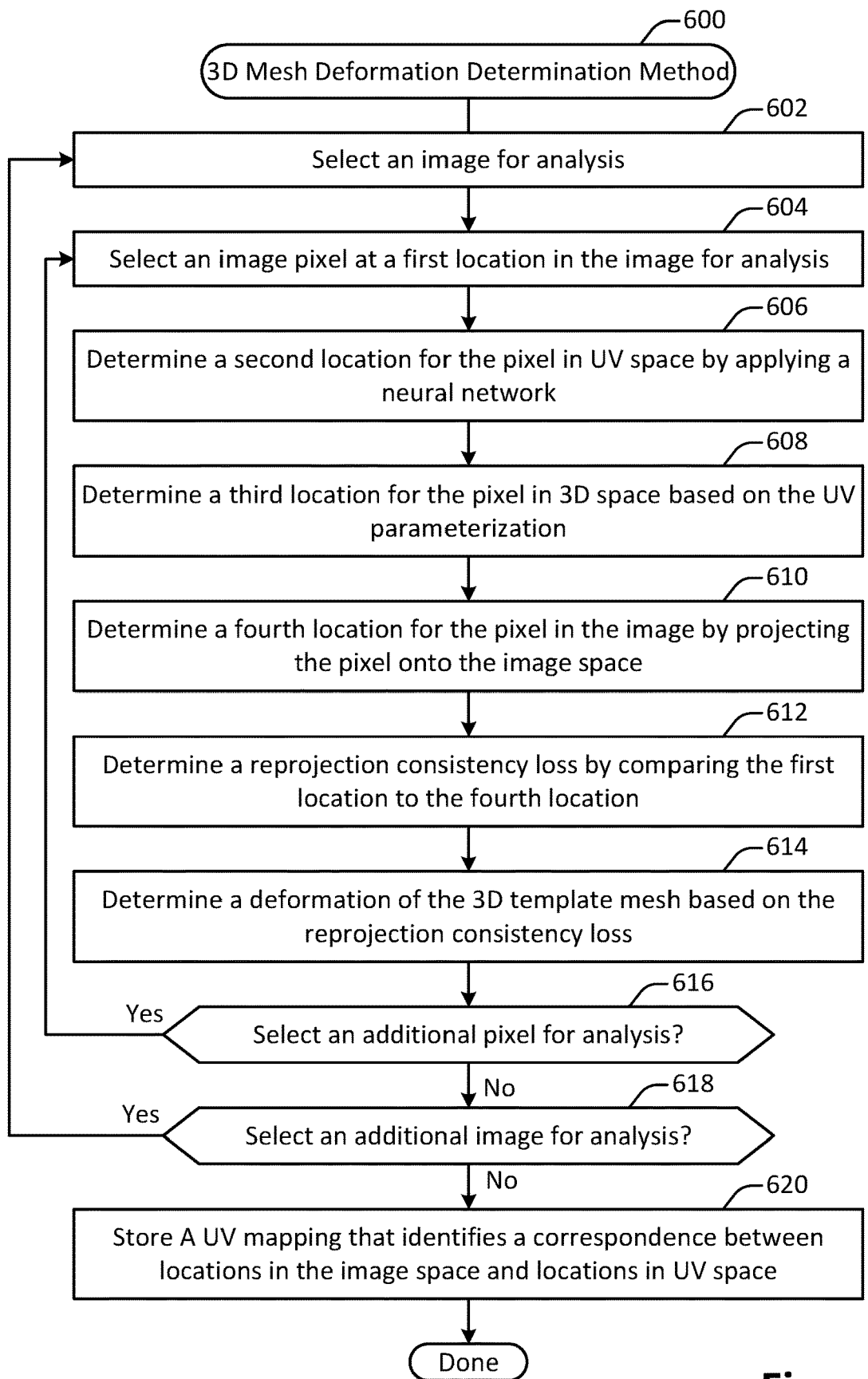
FIG. 6 illustrates a method for determining a 3D mesh deformation, performed in accordance with one or more embodiments.

FIG. 6 illustrates a method 600 for determining a 3D mesh deformation, performed in accordance with one or more embodiments. According to various embodiments, the method 600 may be performed after a UV mapping is performed as described with respect to the method 400 shown in FIG. 4. For example, the method 400 may be performed based on a request received at operation 110 shown in FIG. 1. Many of the operations shown in FIG. 6 are similar to those described with respect to FIG. 4, and for brevity the details regarding those operations are not repeated.

An image is selected for analysis at 602. An image pixel at a first location in the image is selected for analysis at 604. A second location for the pixel in UV space is determined at 606 by applying a neural network. A third location for the pixel in 3D space is determined at 608 based on the UV parameterization. A fourth location for the pixel in the image is determined at 610 by projecting the pixel onto the image space. A reprojection consistency loss is determined at 612 by comparing the first location to the fourth location.

A deformation of the 3D template mesh is determined based on the reprojection consistency loss. According to various embodiments, to allow for learnable deformations, the system may learn residuals over an average category-specific mesh $d_{avg}$. This residual may be modeled as a deformed position map $\in R^2 \to R^3$, which may be predicted by a convolutional neural network. The actual position map $D(\cdot) \in R^2 \to R^3$ may be represented as $D(I)=D_{avg}+d(I)$. A regularizing loss may be employed to enforce smoothness over the predictions. The final loss may then become $L_{def}=\text{Smoothness}(D(I))+L_2\text{Reg}(d(I))$.

A determination is made at 616 as to whether to select an additional pixel for analysis. A determination is made at 618 as to whether to select an additional image for analysis. At 620, a UV mapping that identifies a correspondence between locations in the image space and locations in UV space is stored.

In some implementations, utilizing multiple views of an instance allows extension to new modalities such as videos. For example, the system may start with multiple corresponding views of an object along with the associated camera poses. In order to exploit multi-view information during training and learn effective $f_{uv}(\cdot)$ and $D(\cdot)$, the system may employ a multi-view consistency loss that goes from a pixel from one view and jumps into another view. For instance, take two images from different views of the same object, $I_1$ and $I_2$, which have camera parameters $\pi_1$, $\pi_2$. Here $\phi_{pi}$ represents the transformation from 3D space to the image space with camera parameters $\pi$. $D_1$ and $D_2$ represent $D(I_1)$ and $D(I_2)$. Then, preliminaries for UV consistency loss may be defined as follows:

$$\tilde{p}_{1 \to 2} = \phi_{\pi_2} * D_1(f_{uv_1}(p_1)), \text{ where } p_1 \in I_1$$

$$\tilde{p}_{2 \to 1} = \phi_{\pi_1} * D_2(f_{uv_2}(p_2)), \text{ where } p_2 \in I_2$$

According to various embodiments, $\tilde{p}_{1 \to 2}$ refers to the projection of point $p_1$ from image space $I_1$ to $I_2$. Assuming correct predictions, it should map $p_1$ to its corresponding semantic location in $I_2$. Therefore, the UV prediction of the corresponding point in $I_2$ should remain the same as the one in $I_1$. The same route may be followed in the opposite direction to get an additional error signal. $f_{uv_1}(\cdot)$ and $f_{uv_2}(\cdot)$ represent the learnt functions mapping pixel locations in image $I_1$, $I_2$ to their corresponding UVs respectively.

$$L_{uv}^{(1 \to 2)} = \sum_{p_1 \in I_1} (f_{uv_1}(p_1) - f_{uv_2}(\tilde{p}_{1 \to 2}))^2$$

$$L_{uv}^{(2 \to 1)} = \sum_{p_2 \in I_2} (f_{uv_2}(p_2) - f_{uv_1}(\tilde{p}_{2 \to 1}))^2$$

$$L_{uv} = L_{uv}^{(1 \to 2)} + L_{uv}^{(2 \to 1)}$$

According to various embodiments, the following passages describe a combination of the overall model. The model may be operationalized with, for instance, Deeplab V3+ with more skip connections and a Resnet 18 encoder to model $f_{uv}(\cdot)$ and $D(\cdot)$. A separate decoder sub-network may be used for each task (e.g., UV prediction, segmentation, deformation-field prediction). The system may be trained end-to-end to optimize the combination of the losses discussed earlier:

$$L = \lambda_{repr} * L_{repr} + \lambda_{vis} * L_{vis} + \lambda_{def} * L_{def}$$

According to various embodiments, the following passages described experiments that were performed with various embodiments of the techniques and mechanisms described herein. However, different results may be obtained depending on, for instance, initialization parameters, input data, computing hardware, and other such factors. Accordingly, the experiments are intended to provide examples of the performance of the techniques and mechanisms described herein under particular conditions, but are not intended to be limiting in any way.

According to various embodiments, the example experiments described below employ $\lambda_{repr}=1$, $\lambda_{vis}=1$, $\lambda_{def}=0.025$ as parameters. However, other parameters may be used. Further, the model may be run with datasets that include multi-view instances or datasets without multiple instances as well. The performance of the experiments is measured using ground-truth annotations. Model performance of the predicted instance-specific mesh and surface mapping is objectively measured.

According to various embodiments, the framework may attempt learning instance-specific geometry by exploiting multi-view consistency. To perform evaluation in a fair manner, the experiments employ a multi-view dataset of RGB images, segmentation masks and their corresponding camera poses. The dataset contains instance from three categories: faces, cars and airplanes. For faces, an existing dataset 300WLP contains RGB images, 3D facial mesh and 3D morphable model (3DMM) parameters. The 300WLP is adapted by frontalizing all the meshes and the corresponding position maps. The system also generates also generate ground truth depth and $f_{uv}$ to help in evaluating supervised baselines. For cars and airplanes, the dataset consisted of manually selected 500 high-quality car and airplane meshes. For each instance, the system generated 100 view-points per instance in a 360-degree smooth camera trajectory around the mesh. The system used Blinn-Phong shading model for rendering in OpenGL, along with 8 point lights and one single directional light attached to the virtual camera looking direction.

Figure 7:
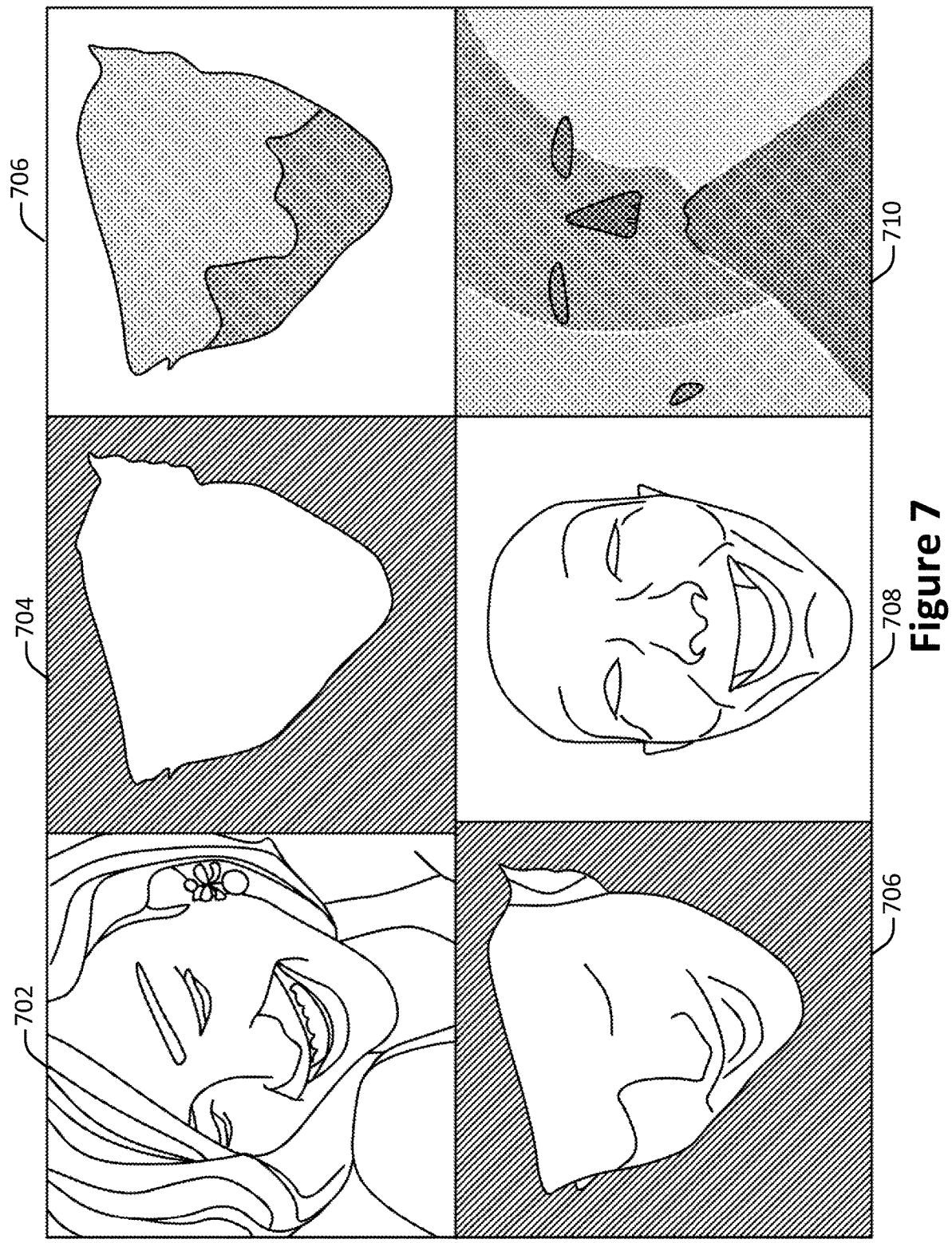
FIG. 7 illustrates data from a dataset of faces, generated in accordance with one or more embodiments.

FIG. 7 illustrates data from the faces dataset, generated in accordance with one or more embodiments. The data includes the input 2D image 702, segmentation mask 704, and the corresponding $f_{uv}$ map 706. The data also includes the depth map 706, the frontalized mesh 708, and the corresponding frontalized position map D 710.

According to various embodiments, the experiments were implemented in PyTorch using architecture based on DeepLabV3+. UV and positionmap prediction have separate decoders. The training and testing experiments were performed on an NVIDIA GeForce GTX 1080 Ti GPU with 8 cores each running @ 3.3 GHz. The approach was evaluated by computing the Percentage of Correct Keypoints (PCK). Quantitative evaluations and loss ablations were focused on the face dataset because it includes dense UV annotations and ground truth position maps.

Experiments—Effectiveness of Reprojection

This sub-section describes considering scenarios where ground truth annotations were used to learn each component. Specifically, 'Learning only UVs' refers to learning UV mapping while using ground truth meshes for each instance; and 'Learning only PosMaps' refers to learning meshes while using ground truth UV mapping for each instance. Then, a weakly supervised setting without pixel-level labels is employed. 'Learning UVs with fixed mesh' involves learning the UV mapping with an average mesh instead of an instance-specific ground truth mesh. Finally, supervision with pixel-level annotations is employed. 'Learning with dense labels' involves learning the UV mapping and PosMap using direct supervision from the labels.

To gain a holistic understanding of model performance, evaluations on both UV and PosMap are performed. Evaluation on multiple thresholds was performed to gain both fine and coarse-grained understanding. Table 1 and Table 2 contain UV and PosMap evaluations respectively and summarize the results when comparing training with only reprojection to other approaches.

Table 1 shows the effectiveness of reprojection as a supervisory signal even in the absence of dense labels. The approach is comparable to the supervised baseline at coarse $\alpha$'s despite not having any dense label supervision at all.

TABLE 1

| Approach | UV-Pck@ | | | |
|---|---|---|---|---|
| | 0.01 | 0.03 | 0.1 | AUC |
| Learning UVs with fixed mesh | 5.3 | 32.2 | 90.6 | 94.0 |
| Learning only UVs | 12.1 | 48.6 | 91.1 | 94.8 |
| Learning with dense labels | 55.1 | 94.9 | 99.5 | 98.7 |

Table 2 shows the effectiveness of reprojection in learning the underlying 3D structure without having the underlying geometry during training. Higher Pck-PosMap values may be observed when using ground truth UVs, as the network optimizes for the ideal mesh based on the provided UV mapping, leading to a boost in performance compared to the weakly-supervised variant.

TABLE 2

| Approach | PosMap-Pck@ | | |
|---|---|---|---|
| | 0.01 | 0.03 | 0.1 |
| Learning UVs with fixed mesh | 56.3 | 71.7 | 98.6 |
| Learning only PosMaps | 56.9 | 72.2 | 99.5 |
| Learning with dense labels | 59.0 | 82.0 | 99.8 |

Experiments—Effectiveness of Deformation

According to various embodiments, this sub-section illustrates the effectiveness of learning deformations for better position maps along with their effect on UV performance. First, the effectiveness of the deformation module is examined by studying its impact on performance in a supervised setting with pixel-level supervision. Two variants are used: 1) Unconstrained: the position map prediction head directly predicts a 256×256×3 position map with around 43 k valid points; 2) Deformed Mesh: a 256×256×3 'residual' position map is predicted and combined with the mean mesh.

Table 5 shows improved performance when learning deformations instead of an unconstrained position map. Overall, 1) the modules lead to improved performance, especially at finer scales; 2) using such deformations allow the system to converge much more quickly compared to the unconstrained counterpart. This difference may be due at least in part to the intuitive nature of the formulation as well as the ease of predicting residuals over inferring an unconstrained position map.

TABLE 5

| Approach | PosMap-Pck@ | | |
|---|---|---|---|
| | AUC | 0.1 | 0.03 |
| Mean-Fixed Mesh | 96.2 | 97.6 | 42.7 |
| Unconstrained | 97.6 | 99.8 | 74.8 |
| Deformed Mesh | 98.0 | 99.9 | 82.0 |

Second, the effectiveness of residual deformation learning is studied in the absence of pixel-level labels. For these experiments, single-view training is performed in conjunction with reprojection consistency and learning shape deformations. The effectiveness of both the proposed deformation residual formulations is then evaluated. 'Reprojection with Deformed Mesh' utilizes direct prediction of position map residuals. 'Reprojection with Fixed Mesh' is employed as a baseline. Table 3 summarizes the results and shows the benefit of utilizing deformations over a fixed mesh. Considerable performance improvement is observed, especially for UV predictions.

TABLE 3

| Approach | UV-Pck@ | | | | PosMap-Pck@ | | |
|---|---|---|---|---|---|---|---|
| | 0.01 | 0.03 | 0.1 | AUC | 0.01 | 0.03 | 0.1 |
| Reprojection with Fixed Mesh | 5.3 | 32.2 | 90.6 | 94.0 | 35.8 | 58.8 | 98.1 |
| Reprojection with Deformed Mesh | 13.5 | 57.8 | 96.0 | 95.7 | 35.8 | 59.3 | 97.9 |

Experiments—Effectiveness of Multi-View Training

According to various embodiments, this sub-section compares the single-view training with the multi-view training setting. Performance with both a fixed and deformed mesh is evaluated. In the fixed mesh setting, 'Single-view Reprojection with Fixed Mesh' and 'Multi-view Reprojection with Fixed Mesh' are the single and multi-view training settings. Then, in the overall model with deformations on top, 'Deformed Single-view Reprojection' and 'Deformed Multi-view Reprojection' refer to the single and multi-view settings for training with deformed meshes. Table 4 summarizes the results and demonstrates consistent performance gains with the usage of multi-view training, illustrating the effectiveness of the approach.

TABLE 4

| Approach | UV-Pck@ | | | | PosMap-Pck@ | | |
|---|---|---|---|---|---|---|---|
| | 0.01 | 0.03 | 0.1 | AUC | 0.01 | 0.03 | 0.1 |
| Single-view Reprojection with Fixed Mesh | 5.3 | 32.2 | 90.6 | 94.0 | 56.3 | 71.7 | 98.6 |
| Multi-view Reprojection with Fixed Mesh | 5.8 | 34.0 | 90.8 | 94.2 | 56.3 | 71.7 | 98.6 |
| Deformed Single-view Reprojection | 13.5 | 57.8 | 96.0 | 95.7 | 56.4 | 72.4 | 98.5 |
| Deformed Multi-view Reprojection | 13.4 | 58.4 | 96.2 | 95.9 | 56.5 | 72.7 | 98.6 |

Experiments—Comparison with Existing Approaches

Few comparable approaches exist. One approach that may be compared is CSM. Table 6 shows that techniques and mechanisms described herein outperform CSM. In addition, the fully-supervised baseline is also included.

TABLE 6

| Approach | UV-Pck@ | | PosMap-Pck@ | |
| --- | --- | --- | --- | --- |
| | 0.03 | 0.1 | 0.03 | 0.1 |
| CSM* | 32.2 | 90.6 | 71.7 | 98.6 |
| Our Approach | 58.4 | 96.2 | 72.7 | 98.6 |
| Fully Supervised | 94.9 | 99.5 | 82.0 | 99.8 |

Experiments—Qualitative Results

Figure 8:
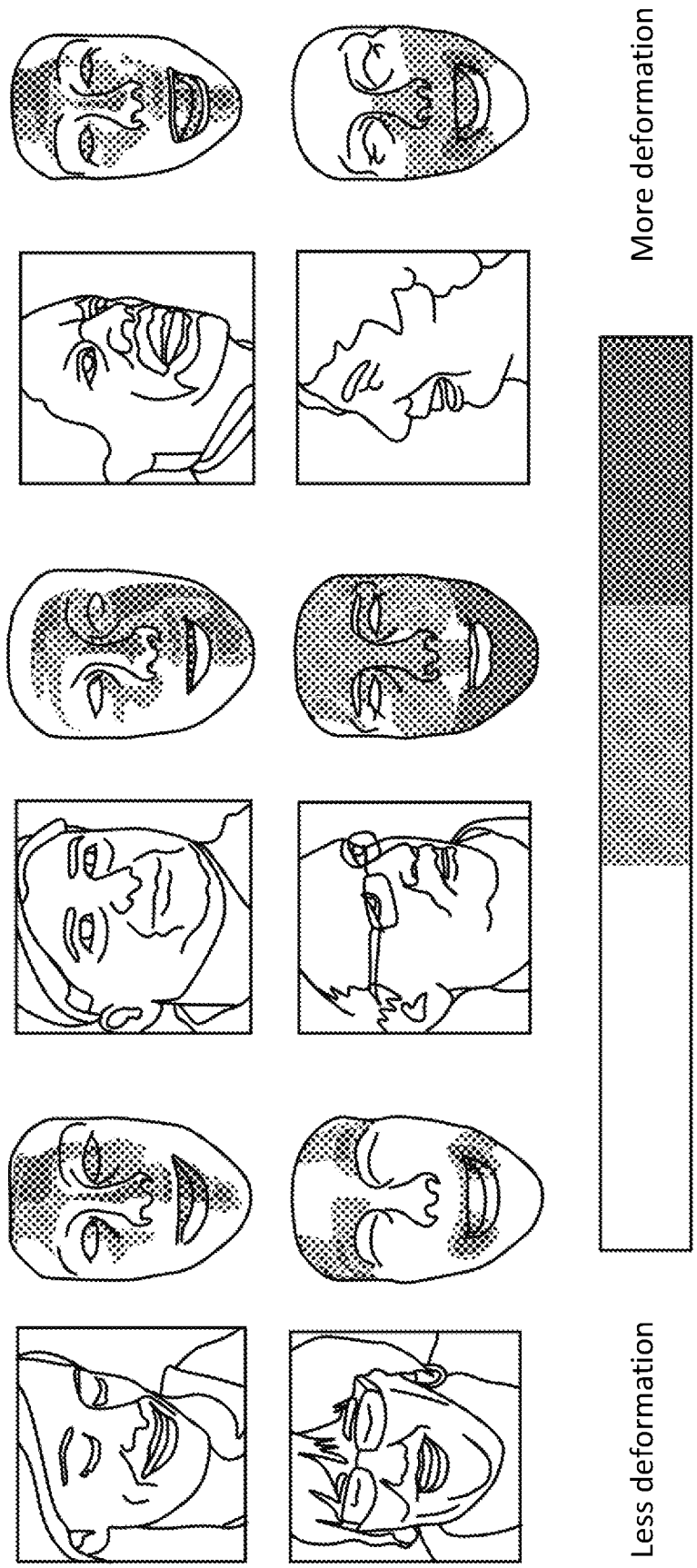
FIG. 8 shows a few examples of instance-specific deformations, generated in accordance with one or more embodiments.

FIG. 8 shows a few examples of instance-specific deformations, generated in accordance with one or more embodiments, with weakly-supervised model predictions on the top row (i.e., techniques and mechanisms described herein) and supervised predictions on the bottom row. Both the supervised and weakly supervised networks learn to predict open/closed mouth, elongated/rounded, bigger/smaller face shapes. The weakly supervised model shown is trained with multi-view reprojection consistency cycle. No symmetry constraints were added. The supervised approach learns implicit symmetry, whereas the weakly-supervised one focuses only on the visible parts of the face (note that even a sun hat covered portion is ignored). This is expected as the supervised network could see the full position map during training, while the reprojection-cycle-trained model had error signal only for the foreground (because of the visibility loss described earlier). While the predictions make intuitive sense, a significant increase in PCK UV is also observable, as shown in Table 5.

Experiments—Learning on New Datasets

According to various embodiments, learning on a new dataset may involve identifying segmentation masks, camera poses and, optionally, multiple views of different instances. Camera poses can be inferred in case a few keypoint annotations are provided by methods like PnP (Perspective-n-Point). Segmentation masks for a given category can be inferred via an off-the-shelf model. Alternatively, or additionally, for any new multi-view dataset or other categories, SfM can be run on the images to compute poses and a point cloud. These point clouds can then be aligned to each other to ensure that all the point clouds are in a single common coordinate system. Finally, these point clouds can be scaled to ensure that they are in a unit cube.

Any of the disclosed implementations may be embodied in various types of hardware, software, firmware, computer readable media, and combinations thereof. For example, some techniques disclosed herein may be implemented, at least in part, by non-transitory computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Java, Python, C++, C, HTML, any other markup language, JavaScript, ActiveX, VBScript, or Perl. Examples of non-transitory computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A non-transitory computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. Particular embodiments may be implemented without some or all of the specific details described herein. In other instances, well known process operations have not been described in detail in order not to unnecessarily obscure the present invention. Accordingly, the breadth and scope of the present application should not be limited by any of the implementations described herein, but should be defined only in accordance with the claims and their equivalents.

The invention claimed is:

1. A method comprising:
   determining via a processor a correspondence between one or more two-dimensional images of a three-dimensional object and a UV representation of a three-dimensional template mesh of the three-dimensional object by training a neural network, the three-dimensional template mesh including a plurality of points in three-dimensional space and a plurality of edges between the plurality of points;
   determining via the processor a deformation of the three-dimensional template mesh, the deformation displacing one or more of the plurality of points, wherein the deformation is determined so as to reduce reprojection consistency loss when mapping points from the two-dimensional images back onto the two-dimensional images through both the UV representation and the three-dimensional template mesh, wherein the one or more two-dimensional images include a proximate two-dimensional image, the proximate two-dimensional image being captured from a proximate virtual camera pose, wherein a reprojection consistency loss value depends in part on a proximate reprojection consistency loss value computed for a corresponding pixel in the proximate two-dimensional image; and
   storing on a storage device a deformed three-dimensional template mesh.

2. The method recited in claim 1, wherein training the neural network comprises predicting, for a first location in a designated one of the two-dimensional images, a corresponding second location in the UV representation.

3. The method recited in claim 2, wherein training the neural network further comprises determining a third location in the three-dimensional template mesh by mapping the second location to the third location via UV parameterization.

4. The method recited in claim 3, wherein training the neural network further comprises determining a fourth location in the designated two-dimensional image by projecting the third location onto the virtual camera pose associated with the designated two-dimensional image.

5. The method recited in claim 4, wherein training the neural network further comprises determining a reprojection consistency loss value representing a displacement in two-dimensional space between the first location and the fourth location.

6. The method recited in claim 5, wherein training the neural network further comprises updating the neural network based on the reprojection consistency loss value.

7. The method recited in claim 4, the method further comprising:
determining the virtual camera pose by analyzing the two-dimensional image to identify a virtual camera position and virtual camera orientation for the two-dimensional image relative to the three-dimensional template mesh.

8. The method recited in claim 4, wherein the one or more two-dimensional images include at least the designated two-dimensional image and the proximate two-dimensional image.

9. The method recited in claim 1, wherein training the neural network comprises determining a visibility loss value representing occlusion of a designated portion of the three-dimensional object within a designated one of the two-dimensional images and update the neural network based on the visibility loss value.

10. The method recited in claim 1, the method further comprising:
determining an object type corresponding to the three-dimensional object by analyzing one or more of the one or more two-dimensional images; and
selecting the three-dimensional template mesh from a plurality of available three-dimensional template meshes, the three-dimensional template mesh corresponding with the object type.

11. The method recited in claim 10, wherein the object type is a vehicle, and wherein the three-dimensional template mesh provides a generic representation of vehicles.

12. The method recited in claim 10, wherein the object type is a vehicle sub-type, and wherein the three-dimensional template mesh provides a generic representation of the vehicle sub-type.

13. A computing system comprising a processor and a storage device, the computing system configured to perform a method comprising:
determining via the processor a correspondence between one or more two-dimensional images of a three-dimensional object and a UV representation of a three-dimensional template mesh of the three-dimensional object by training a neural network, the three-dimensional template mesh including a plurality of points in three-dimensional space and a plurality of edges between the plurality of points;
determining via the processor a deformation of the three-dimensional template mesh, the deformation displacing one or more of the plurality of points, wherein the deformation is determined so as to reduce reprojection consistency loss when mapping points from the two-dimensional images back onto the two-dimensional images through both the UV representation and the three-dimensional template mesh, wherein the one or more two-dimensional images include a proximate two-dimensional image, the proximate two-dimensional image being captured from a proximate virtual camera pose, wherein a reprojection consistency loss value depends in part on a proximate reprojection consistency loss value computed for a corresponding pixel in the proximate two-dimensional image; and
storing on the storage device a deformed three-dimensional template mesh.

14. The computing system recited in claim 13, wherein training the neural network comprises predicting, for a first location in a designated one of the two-dimensional images, a corresponding second location in the UV representation, wherein training the neural network further comprises determining a third location in the three-dimensional template mesh by mapping the second location to the third location via UV parameterization, wherein training the neural network further comprises determining a fourth location in the designated two-dimensional image by projecting the third location onto a virtual camera pose associated with the designated two-dimensional image, wherein training the neural network further comprises determining a reprojection consistency loss value representing a displacement in two-dimensional space between the first location and the fourth location, wherein training the neural network further comprises updating the neural network based on the reprojection consistency loss value.

15. The computing system recited in claim 14, the method further comprising:
determining the virtual camera pose by analyzing the two-dimensional image to identify a virtual camera position and virtual camera orientation for the two-dimensional image relative to the three-dimensional template mesh.

16. The method recited in claim 14, wherein the one or more two-dimensional images include at least the designated two-dimensional image and the proximate two-dimensional image.

17. The computing system recited in claim 13, wherein training the neural network comprises determining a visibility loss value representing occlusion of a designated portion of the three-dimensional object within a designated one of the two-dimensional images and update the neural network based on the visibility loss value.

18. The computing system recited in claim 13, the method further comprising:
determining an object type corresponding to the three-dimensional object by analyzing one or more of the one or more two-dimensional images; and
selecting the three-dimensional template mesh from a plurality of available three-dimensional template meshes, the three-dimensional template mesh corresponding with the object type.

19. One or more non-transitory computer readable media having instructions stored thereon for performing a method, the method comprising:
determining using a processor a correspondence between one or more two-dimensional images of a three-dimensional object and a UV representation of a three-dimensional template mesh of the three-dimensional object by training a neural network, the three-dimensional template mesh including a plurality of points in three-dimensional space and a plurality of edges between the plurality of points;

determining via the processor a deformation of the three-dimensional template mesh, the deformation displacing one or more of the plurality of points, wherein the deformation is determined so as to reduce reprojection consistency loss when mapping points from the two-dimensional images back onto the two-dimensional images through both the UV representation and the three-dimensional template mesh, wherein the one or more two-dimensional images include a proximate two-dimensional image, the proximate two-dimensional image being captured from a proximate virtual camera pose, wherein a reprojection consistency loss value depends in part on a proximate reprojection consistency loss value computed for a corresponding pixel in the proximate two-dimensional image; and storing on the storage device a deformed three-dimensional template mesh.

20. The one or more non-transitory computer readable media recited in claim 19, wherein training the neural network comprises predicting, for a first location in a designated one of the two-dimensional images, a corresponding second location in the UV representation, wherein training the neural network further comprises determining a third location in the three-dimensional template mesh by mapping the second location to the third location via the UV parameterization, wherein training the neural network further comprises determining a fourth location in the designated two-dimensional image by projecting the third location onto a virtual camera pose associated with the designated two-dimensional image, wherein training the neural network further comprises determining a reprojection consistency loss value representing a displacement in two-dimensional space between the first location and the fourth location, wherein training the neural network further comprises updating the neural network based on the reprojection consistency loss value.

* * * * *